UNITED STATES PATENT OFFICE.

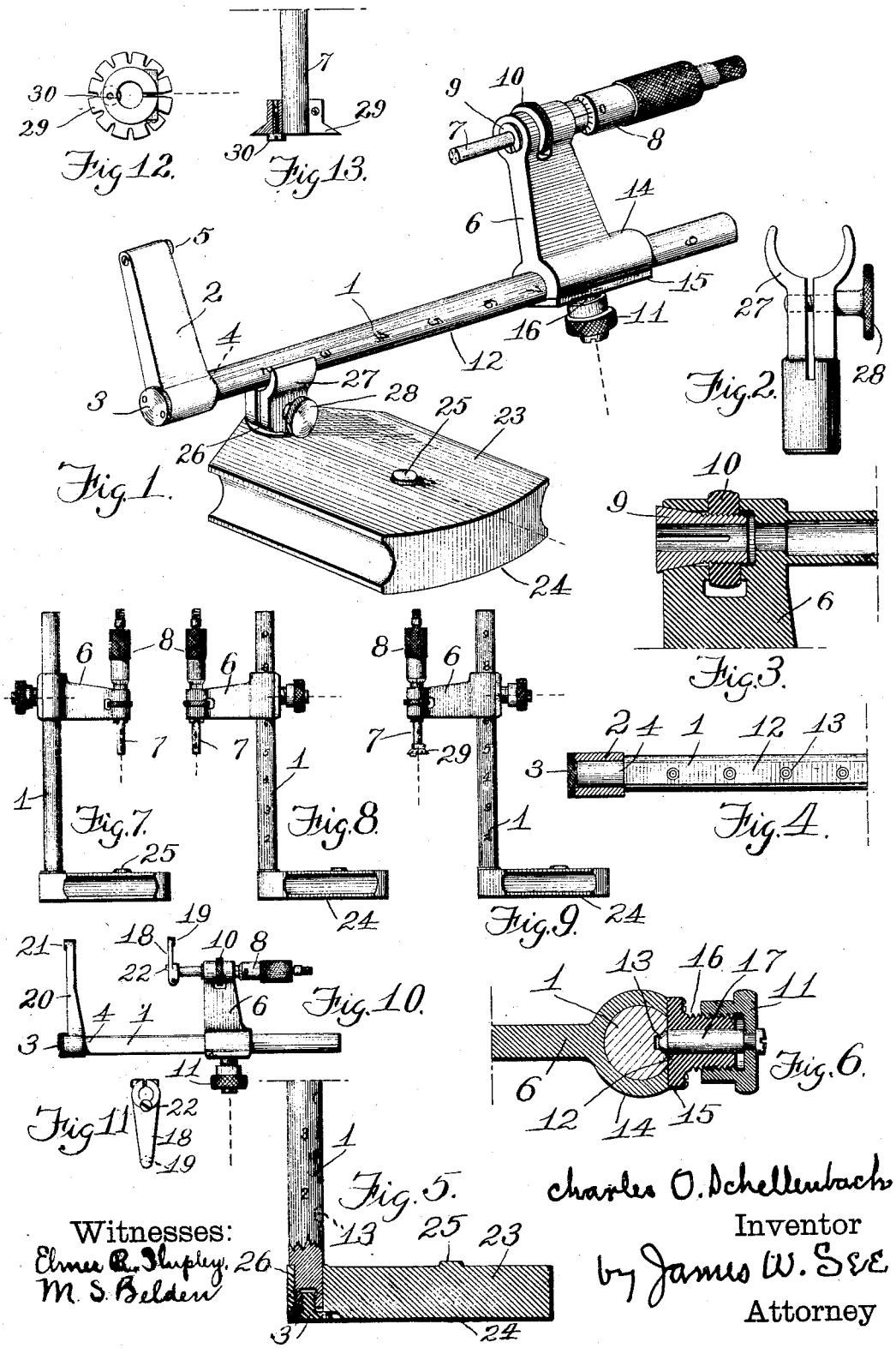

CHARLES O. SCHELLENBACH, OF CINCINNATI, OHIO.

MICROMETER-GAGE.

No. 923,446.　　　Specification of Letters Patent.　　　Patented June 1, 1909.

Application filed September 8, 1908. Serial No. 451,929.

*To all whom it may concern:*

Be it known that I, CHARLES O. SCHELLENBACH, a citizen of the United States, residing at Cincinnati, Hamilton county, Ohio, have invented certain new and useful Improvements in Micrometer-Gages, of which the following is a specification.

This invention, pertaining to improvements in micrometer gages, will be readily understood from the following description taken in connection with the accompanying drawing in which:—

Figure 1 is a perspective view of my improved gage: Fig. 2 a side elevation of the base-clamp: Fig. 3 a vertical longitudinal section of the spindle-stock at the spindle-clamp: Fig. 4 a bottom view of the bar: Fig. 5 a vertical longitudinal section of the base-block: Fig. 6 a vertical transverse section of the spindle-stock and bar-clamp: Fig. 7 a side elevation of the general instrument when used as a vertical measuring machine to measure between the spindle and the base-anvil: Fig. 8 a side elevation of the general instrument when used as a measuring machine to measure between the spindle and a surface against which the base of the instrument sets: Fig. 9 a side elevation of the general instrument when used as a surface and scribing gage: Fig. 10 a side elevation of the instrument when used for inside gaging: Fig. 11 an elevation of the inner face of the supplementary spindle-arm: Fig. 12 a plan of the scratch-disk: and Fig. 13 a vertical section of the scratch-disk.

In the drawing:—1 indicates a bar of general cylindrical form and having a flattened side: 2, an anvil-stock having in its hub a socket fitting accurately upon a tenon on one end of the bar: 3, a screw in the tenon end of the bar and serving to hold the anvil-stock firmly to place: 4, the shoulder on the bar, at the foot of the tenon, against which the anvil-stock is accurately drawn by screw 3: 5, the anvil at the inner face of the outer extremity of the anvil-stock, this anvil forming one of the measuring surfaces when the instrument is in use with the anvil-stock: 6, the spindle-stock, arranged to slide on the bar to and from the anvil-stock: 7, the spindle, sliding through the outer extremity of the spindle-stock, parallel with the bar and in alinement with the anvil, as usual in micrometer gages, the inner end of this spindle forming one of the measuring surfaces of the instrument: 8, micrometer mechanism coöperating with the spindle-stock and spindle to gage the endwise movement and position of the spindle, as usual in micrometer gages and, preferably, reading to the thousandth of an inch: 9, a split bushing surrounding the spindle and nicely fitting the spindle, this bushing having a tapering exterior fitting a tapering bore in the inner portion of the spindle-bearing in the spindle-stock: 10, a nut seated in a transverse slot in the spindle-bearing and engaging a threaded hub projecting from the rear of the tapered bushing: 11, a clamp-nut to serve in clamping the spindle-stock to selected position on the bar: 12, the flattened side of the bar, extending the entire length of the bar over which the spindle-stock is to slide: 13, a longitudinal series of tapering or conical holes in the flat side of the bar, the distance between these holes being accurately established to some standard unit, preferably one inch: 14, the hub of the spindle-stock, accurately fitting the unflattened portion of the bar: 15, a plate secured against the open side of this hub and lying against the flattened face of the bar but not with any such tightness as to interfere with the free sliding of the hub upon the bar, this plate forming a separable portion of the wall of the hub: 16, a hollow threaded nose projecting outwardly from this plate, the clamping nut 11 screwing upon this nose: and 17, a dowel-pin accurately fitting the bore of the nose and sliding therein and having its inner end formed to fit the index holes 13 in the bar, the outer end of this pin being connected with clamping nut 11 so that the nut may move the pin in or out of engagement with the bar.

The instrument as thus far described is to be considered as a micrometer gage to be held in the hand and employed in the manner usual with micrometer gages. Assume the range of endwise movement of the spindle to be one inch, reading in thousandths on the micrometer as usual, and assume the spindle-stock to be positioned on the bar with its dowel-pin in the second hole of the bar. Under these conditions, when the micrometer stands at zeros, the spindle will be in position of maximum retreat, and the distance between the anvil and the spindle-end will be one inch. The micrometer may then be used for gaging any dimensions up to one inch. If, now, the spindle-stock be positioned on the bar with its dowel-pin in the third hole of the bar then one inch has been added to the measuring capacity of the instrument and dimensions between one and two inches may be read from the the micrometer, and so on, up to the length capacity of the bar as determined by the dowel hole farthest from the anvil-stock, the number of dowel holes in the series indicating all but the final inch, the final inch, or as much as there is of it, being read from the micrometer.

So far as mere measuring capacity is concerned, that of the instrument, as thus far described, does not exceed that of known micrometer gages with shifting spindle-stocks, but in the present instrument the construction is such as to enhance the accuracy of the results and the facility for arriving at them.

In using this instrument or, indeed, in using any micrometer gage of the same general character, it is often desirable to lock the spindle after adjustment and locks have been provided for this purpose. In the present case, under ordinary conditions this spindle is free to slide freely through bushing 9, fitting it nicely and being supported by it at a point as close as possible to the end of the spindle. When it is desired to lock the spindle then nut 10 is turned, drawing the split bushing inwardly and contracting it upon the spindle which becomes tightly clamped without disturbing its axial position. Known spindle-clamps in micrometers are defective in that they are defective in clamping power, or throw the spindle to eccentric position, or interfere or do not promote the guidance of the spindle at a point as near as possible to its gaging end. In the present case the split bushing, quite apart from its capacity as a spindle-lock, serves as an adjustable nicely fitting guide at the extreme inner portion of the spindle-bearing in the spindle-stock.

In setting the spindle-stock to selective position upon the rod, eyesight need not be depended upon further than to determine, by means of designating numbers on the rod, the number of the dowel-hole which is to be employed. The dowel-pin having been brought into fair coincidence with the selected hole, when clamping nut 11 is screwed up it forces the end of the dowel-pin into the dowel-hole and by that act shifts the spindle-stock along the rod to accurate position and clamps it there, the same finger-motion which serves in thus accurately positioning the spindle-stock serving also to grip the spindle-stock firmly and accurately to the inside or unflattened side of the bar. When the dowel-pin is withdrawn from the bar, to permit the spindle-stock to be shifted, then the flat side of the bore of the hub, as represented by the inner surface of plate 15, coöperates with the flat side of the bar and prevents the spindle-stock from shifting angularly on the bar to any material extent. The cross-sectional form of the bar, a cylinder with a flat side, lends itself to accurate and economical production, as is also the case with the non-cylindrical bore of the hub of the spindle-stock when formed partly by the attached plate 15. It should be stated that clamp-nut 11 is swiveled upon the head of the dowel-nut so that the latter need not turn with the pin so that the latter need not turn with the nut, a construction deemed preferable to screwing the pin through nose 16, the latter construction being, however, in other respects equivalent to that illustrated.

The instrument has been thus far described as a convenient gage of considerable range, to be held in the hand and used in measuring gaging. I also arrange for the use of the instrument for internal gaging.

Proceeding with the drawing:—18 (Figs. 10 and 11) indicates a short arm having its hub clamped removably upon the extreme end of the spindle: 19, an outwardly facing gage-surface on the outer face of the outer extremity of this arm: 20, a substitute anvil-stock to take the place of regular anvil-stock 2 on the end of the bar: 21, an anvil on the outer surface of the outer extremity of the substitute anvil-stock, the lengths of anvil-stock 20 and arm 18 being such that the measuring surfaces 21 and 19 carried by them will be the same distance from the bar: and 22, a screw threaded into the hub of arm 18 parallel with and near the bore of the hub, this screw having a flat head projecting inwardly beyond the wall of the bore.

When substitute anvil-stock 20 is in place then the instrument presents a measuring anvil outwardly instead of inwardly, and when arm 18 is in place then measuring surface 19 becomes an outwardly presenting surface as a substitute for the inwardly presenting measuring surface represented by the end of the spindle. Screw 22 is screwed tightly up against the end of the arm 18 and its inner surface comes in contact with the measuring end of the spindle, the consequence being that, when the arm is secured to the spindle, with the head of the screw against the end of the spindle, measuring surface 19 stands rearward a definite distance from the end of the spindle. Let this distance be, say, one quarter of an inch. Having reference to the plane of the surface of regular anvil 5 when the regular anvil stock is employed, let the surface of substitute anvil 21 be, say, three-quarters of an inch outwardly from that plane, a matter to be determined, in making the instrument, by the distance from shoulder 4 to anvil 21, as compared with the distance from shoulder 4 to anvil 5. Under these conditions the instrument may be employed for inside gaging and the capacity of the instrument would be one inch more than when the instrument is arranged and employed for outside gaging, that is to say, the inches as determined by the dowel-hole, should be taken as one more, the micrometer being read as usual for anything within the one inch capacity of the spindle movement. While for outside gaging the instrument has a minimum capacity represented by zero, such is not the case for inside gaging for the instrument will be incapable of gaging any inside dimension less than the outside distance between measuring surface 19 and 21 when the arm and substitute anvil-stock are in position of nearest approach, the minimum capacity for inside gaging thus being, under the assumed set of dimensions for the instrument, something less than one inch.

As thus far described the instrument, whether for inside or outside gaging, has been considered as an instrument to be held in the hand of the user. I make provision for the use of the instrument, either for inside or outside gaging, as a self-supporting structure after the manner of a measuring machine.

Continuing with the drawing:—23 indicates a flat block of sufficient weight to form a substantial base for the instrument, but light enough to permit of ready handling, the side edges of the block being grooved to facilitate grasp by the fingers, this block forming also an anvil-carrying member: 24, the accurately finished lower face of the block: 25, a measuring anvil formed by or upon the upper surface of the block, the distance from this anvil to the lower surface of the block being a definite unit corresponding with the distance between the dowel-holes in the bar, one inch in the present instance: 26, a vertical cylindrical socket in the block, of a diameter adapting it to accurately fit the tenon end of the bar, the distance from this socket to anvil 25 corresponding with the distance from the bar to the spindle: 27, a clamp having a shank adapted to fit the socket in the block and having a fork adapted to grasp the bar and support it in horizontal position: and 28, a screw for tightening the clamp upon the bar to hold the bar tightly or, if desired, with just sufficient looseness to permit the bar to be turned in the clamp.

When the instrument is supported in the clamp, as seen in Fig. 1, then the gage can be used as a fixture after the manner of a measuring machine, though of such portable character as to be readily placed where desired. The gage can be rotated upon the vertical axis of the clamp and it can also be turned upon the horizontal axis of the bar, thus permitting the gage to be shifted to positions most favorable to the presentation of work and most favorable to the illumination and reading of the micrometer, a very decided advantage in instruments of the micrometer class.

Thus far reference has been made only to the employment of the instrument as a gage measuring between the spindle and an anvil carried by an anvil-stock. Other and quite different uses for the instrument are provided for.

The clamp and anvil-stock being temporarily abandoned, the tenon end of the bar may be secured in the socket of the block, with the micrometer spindle over block-anvil 25. The device then becomes a self-supporting measuring machine as illustrated in Fig. 7. By giving the bar a half turn in the socket of the block the parts take the position indicated in Fig. 8, the instrument now becoming a micrometer surface gage, the end of the spindle being employed in determining distances from it to any flat surface on which the block may stand. As the thickness of the block, from its lower surface to the top of its anvil 25, is one unit, or one inch, it follows that one inch is to be added to the readings of the instrument. By placing arm 18 on the spindle when the instrument is otherwise in the condition illustrated in Fig. 8, the device serves as a surface gage for measuring the distance between a downwardly presenting surface and the surface on which the block rests, and in this use of the instrument the readings will require to be modified by allowing for the distance from the end of the spindle to the plane of measuring surface 19.

Continuing with the drawing:—29 indicates a sharp-edged disk adapted to be clamped to the end of the spindle, the lower face of the disk being a plane accurately at right angles to the axis of the spindle, and the periphery of the disk being, preferably, notched: and 30, a screw in the lower face of the disk, with its head projecting under the spindle in the same manner as has been described in connection with arm 18. When the disk is in place on the end of the spindle, the instrument appears as in Fig. 9. The edge of the disk is very sharp and serves as a scriber, the instrument thus becoming a micrometer scribing gage. Screw 30 accurately positions the flat face of the scribing disk into the plane of the end of the spindle and, the face of the disk being flat, no subsequent grinding of the top of the disk or in the faces of the notches to keep its scribing elements sharp, will modify the accuracy of the instrument as a scribing gage. When the instrument has been adjusted for scribing then the spindle is to be clamped before the scribing disk does its work, otherwise the work of scribing would tend to turn the spindle and disturb the micrometer adjustment.

I claim:—

1. A gage comprising, a bar having a generally cylindrical surface and provided with a longitudinal series of conical dowel-holes, a spindle-stock having a hub adapted to fit and hug the cylindrical surface of the bar opposite the surface provided with the series of dowel-holes and carrying a socket adapted to register with any selected one of said dowel-holes, a dowel-pin fitting said socket and having a conical end adapted to said dowel-holes, and a screw device for moving the dowel-pin into and out of the dowel-holes, combined substantially as set forth.

2. A gage comprising, a bar having a cylindrical surface and a flat face and provided with a longitudinal series of conical dowel-holes in said flat face, a spindle-stock having a hub adapted to fit and hug the cylindrical surface of the bar and carrying a socket adapted to register with any selected one of said dowel-holes, a dowel-pin fitting said socket and having a conical end adapted to said dowel-holes, and a screw device for moving the dowel-pin into and out of the dowel-holes, combined substantially as set forth.

3. A gage comprising, a bar having a cylindrical surface and a flat face and provided with a longitudinal series of conical dowel-holes in said flat face, a spindle-stock having a hub adapted to fit and hug the cylindrical surface of the bar and carrying a socket adapted to register with any selected one of said dowel-holes, a dowel-pin fitting said socket and having a conical end adapted to said dowel-holes, a screw-thread on the exterior of the wall of said socket and concentric therewith, and a nut engaging said screw-thread and swiveled on the outer end of the dowel-pin, combined substantially as set forth.

4. A gage comprising, a bar having a cylindrical surface and a flat face and provided with a longitudinal series of conical dowel-holes in said flat face, a spindle-stock having a hub adapted to fit and hug the cylindrical surface of the bar and having an open side at the flat face of the bar, a plate secured to the open side of said hub and having an outwardly projecting exteriorly threaded nose provided with a cylindrical socket, a dowel-pin fitting said socket and having a conical end adapted to said dowel-holes, and a nut swiveled to the outer end of the dowel-pin and engaging the thread of the nose, combined substantially as set forth.

5. A gage comprising, a bar provided at one end with a tenon and shoulder and having a generally cylindrical surface and provided with a longitudinal series of conical dowel-holes, a spindle-stock having a hub adapted to fit and hug the cylindrical surface of the bar opposite the surface provided with the series of dowel-holes and carrying a socket adapted to register with any selected one of said dowel-holes, a dowel-pin fitting said socket and having a conical end adapted to said dowel-holes, a screw device for moving the dowel-pin into and out of the dowel-holes, an anvil-stock engaging the tenon of the bar, and a screw at the end of the bar for pressing the anvil-stock to said shoulder, combined substantially as set forth.

6. A gage comprising, a bar having a generally cylindrical surface and provided with a longitudinal series of conical dowel-holes, a spindle-stock having a hub adapted to fit and hug the cylindrical surface of the bar opposite the surface provided with the series of dowel-holes and carrying a socket adapted to register with any selected one of said dowel-holes, a dowel-pin fitting said socket and having a conical end adapted to said dowel-holes, a screw-device for moving the dowel-pin into and out of the dowel-holes, a block, and a clamp carried by the block and adapted to engage said bar, combined substantially as set forth.

7. A gage comprising, a bar having a generally cylindrical surface and provided with a longitudinal series of conical dowel-holes, a spindle-stock having a hub adapted to fit and hug the cylindrical surface of the bar opposite the surface provided with the series of dowel-holes and carrying a socket adapted to register with any selected one of said dowel-holes, a dowel-pin fitting said socket and having a conical end adapted to said dowel-holes, a screw-device for moving the dowel-pin into and out of the dowel-holes, a block, and a clamp carried by the block and adapted to rotatably and slidably engage said bar, combined substantially as set forth.

8. A gage comprising, a bar having a generally cylindrical surface and provided with a longitudinal series of conical dowel-holes, a spindle-stock having a hub adapted to fit and hug the cylindrical surface of the bar opposite the surface provided with the series of dowel-holes and carrying a socket adapted to register with any selected one of said dowel-holes, a dowel-pin fitting said socket and having a conical end adapted to said dowel-holes, a screw device for moving the dowel-pin into and out of the dowel-holes, a block provided with a vertical cylindrical socket, and a clamp mounted for angular motion in said socket and adapted to grasp said bar, combined substantially as set forth.

9. A gage comprising, a bar provided at one end with a tenon and shoulder and having a generally cylindrical surface and provided with a longitudinal series of conical dowel-holes, a spindle-stock having a hub adapted to fit and hug the cylindrical surface of the bar opposite the surface provided with the series of dowel-holes and carrying a socket adapted to register with any selected one of said dowel-holes, a dowel-pin fitting said socket and having a conical end adapted to said dowel-holes, a screw device for moving the dowel-pin into and out of the dowel-holes, an anvil-stock removably engaging said tenon, a block provided with a vertical cylindrical socket adapted to fit said tenon, and a clamp adapted to engage said socket and to grasp said bar, combined substantially as set forth.

10. A gage comprising, a bar provided at one end with a tenon and shoulder and having a generally cylindrical surface and provided with a longitudinal series of conical dowel-holes, a spindle-stock having a hub adapted to fit and hug the cylindrical surface of the bar opposite the surface provided with the series of dowel-holes and carrying a socket adapted to register with any selected one of said dowel-holes, a dowel-pin fitting said socket and having a conical end adapted to said dowel-holes, a screw device for moving the dowel-pin into and out of the dowel-holes, an anvil-stock removably engaging said tenon, a block provided with a vertical cylindrical socket adapted to fit said tenon, a clamp adapted to engage said socket and to grasp said bar, and an anvil carried by the upper face of the block, combined substantially as set forth.

CHARLES O. SCHELLENBACH.

Witnesses:
W. J. DAVIDSON,
O. SHINDELDECKER.